Aug. 26, 1952  M. DE HAAS  2,608,449
SLIDE BEARING WEIGHT COMPENSATOR
Filed Nov. 18, 1948  2 SHEETS—SHEET 1

WITNESS:
Louis V. Granger

INVENTOR.
MAX DeHAAS
BY Woodling and Kroot
attys.

Patented Aug. 26, 1952

2,608,449

UNITED STATES PATENT OFFICE 2,608,449

SLIDE BEARING WEIGHT COMPENSATOR

Max De Haas, Dayton, Ohio, assignor to The Monarch Machine Tool Company, a corporation of Ohio Application November 18, 1948, Serial No. 60,797

2 Claims. (Cl. 308—3)

1

This invention relates in general to antifriction devices and more particularly to antifriction devices that compensate for a portion of the weight of an object.

An object of the invention is to provide an antifriction device for two relatively movable elements wherein a bearing is forced against a bearing surface of one element by a force applied through a lever having a mechanical advantage greater than unity.

A further object of the invention is to provide an antifriction device for two relatively movable parts each having slide elements in contact wherein a bearing carried by a spring-urged lever on one part cooperates with a bearing surface on the other part to thus decrease the sliding friction between said slide elements.

A still further object of the invention is to provide a weight compensator for a machine element wherein a roller on the machine element cooperates with a slideway on the base of the machine and the roller is carried by the machine element by a lever which in turn is urged by an adjustably compressed spring to press the roller against the slideway and thus support a proper fraction of the weight of the machine element to decrease the sliding friction between the machine element and the machine base.

Other objects and a fuller understanding of the invention may be had by referring to the following description and claims, taken in conjunction with the accompanying drawings, in which:

The antifriction device of this invention may be used in many ways and, in this application, shall be described as a device for compensating for the weight of a machine element slide such as the carriage or other slide element of a lathe. The description of this invention as being applied to the carriage of a lathe is to be taken as illustrative and not in a limiting sense.

The device is useful in relieving the sliding friction between the slide portions of two machine elements that are slidable relative to each other. The compensation of a portion of the weight of the superior machine element is accomplished by spring-urged lever means to achieve a mechanical advantage greater than unity in the force applied to a bearing which acts on a bearing surface of the inferior machine element.

An application of the invention is shown in

Figure 1:
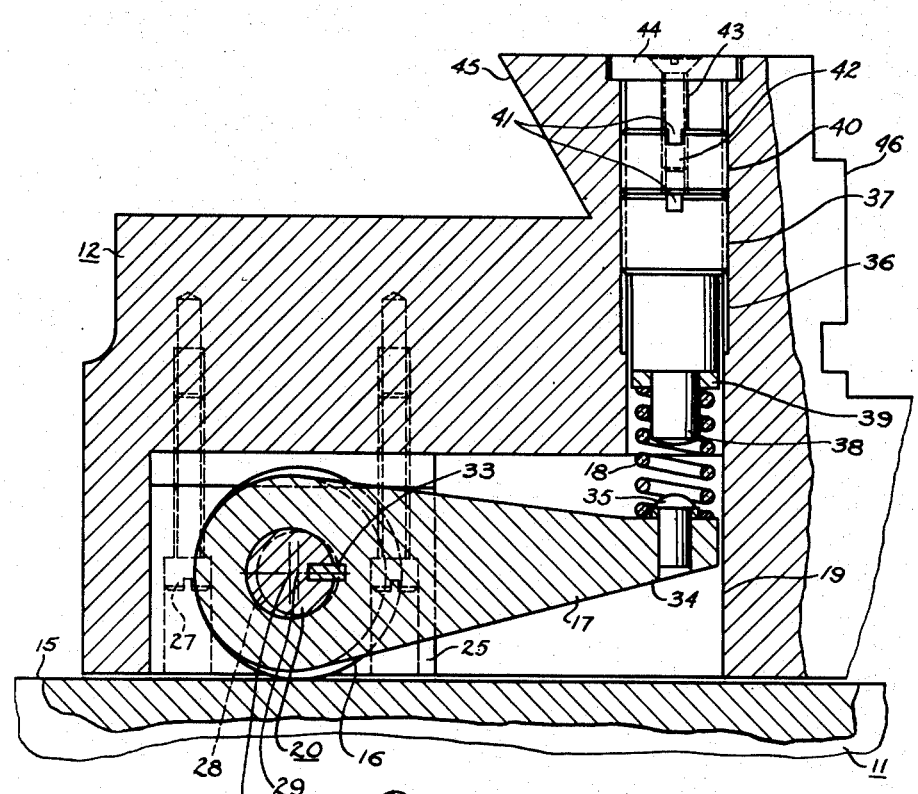
Figure 1 is a sectional side view of the invention as applied to a machine element slide.
Figure 2:
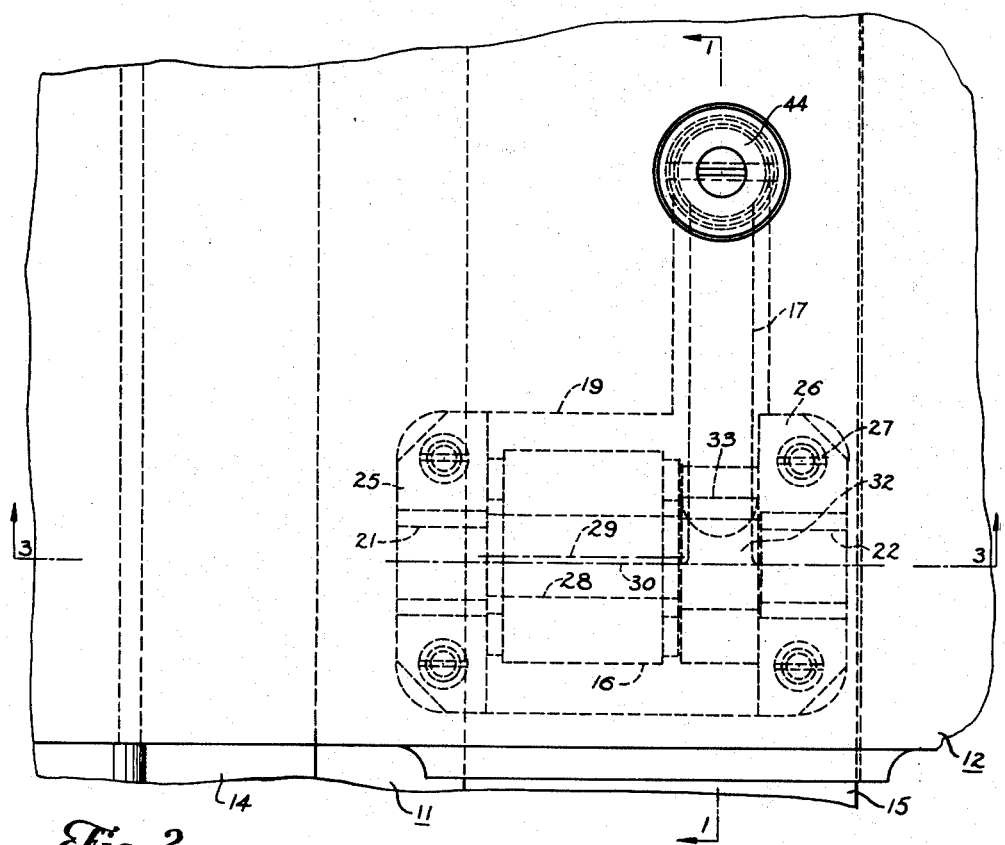
Figure 2 is a top view of the device.
Figure 3:
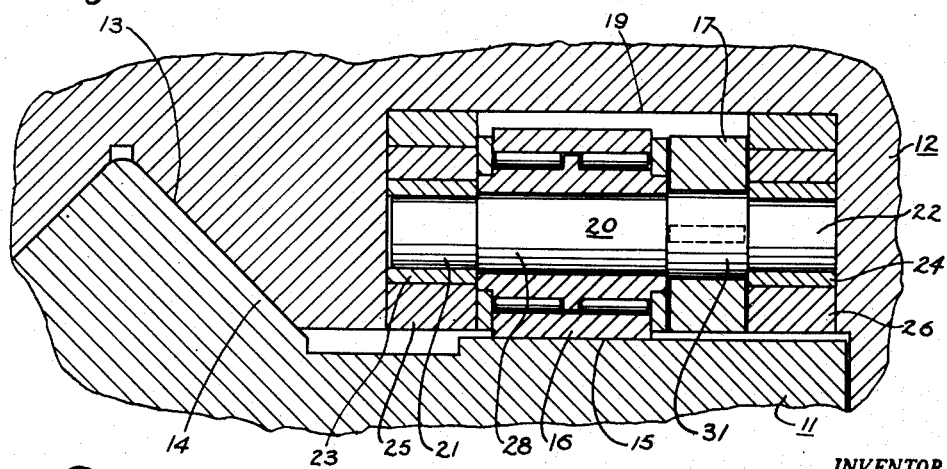
Figure 3 is a sectional view taken along the line 3—3 of Figure 2.

2 the Figures 1, 2 and 3 where the reference character 11 denotes a base, such as the base of a lathe or other machine tool. A machine element such as a carriage 12 is adapted to slide on this base 11 and has a slide surface 13 in sliding contact with a V-guideway 14 on the base 11. The V-guideway 14 and slide surface 13 assure relative movement between the base 11 and carriage 12 along a definite path. The base 11 has a slide portion or bearing surface portion 15, and the carriage 12 carries a bearing 16, such as a roller bearing, for cooperating with this bearing surface portion 15. The roller bearing 16 is carried by the carriage 12 in such a manner that a force is exerted between this bearing 16 and the bearing surface portion 15 to relieve a portion of the sliding friction between the slide surface 13 and V-guideway 14. Such force between the bearing 16 and bearing surface portion 15 is provided by a mechanical advantage means which has been shown as a lever 17 and a spring 18.

The carriage 12 has a cored pocket or recess 19 which is adjacent the bearing surface portion 15. This recess is adapted to house the roller bearing 16. A shaft 20 has first and second end portions 21 and 22 which are journaled for at least partial rotation relative to the carriage 12 by bearings 23 and 24, respectively. The bearings 23 and 24 are fixed in place by the bearing caps 25 and 26. The cap screws 27 are used to attach the bearing caps 25 and 26 to the carriage 12. The shaft 20 has a cylindrical eccentric portion 28 for carrying the roller bearing 16. This cylindrical eccentric portion 28 is cylindrical about a second axis 29 that is parallel to but displaced from the shaft axis 30. The axis of the shaft 20 is perpendicular to the direction of relative movement of the carriage 12 and base 11.

A second cylindrical portion 31 is provided on the shaft 20 upon which a first end 32 of the lever 17 is firmly attached as by the key 33. A second end 34 of the lever 17 carries a protruding bolt-head 35 for centering the spring 18. A threaded aperture 36 is provided in the carriage 12 into which a threaded bolt 37 is threaded for axial adjustment therewith. The threaded bolt 37 has a depending cylindrical end portion 38 about which the spring 18 is coiled to maintain the spring 18 in axial alignment with the bolt 37. A bearing washer 39 may be interposed between the bolt 37 and the spring 18 for prevention of wear on the bolt 37. A lock nut 40 is provided to engage the threaded aperture 36 and to lock the threaded bolt 37 firmly in position. The lock nut 40 and threaded bolt 37 each have a slot 41 for adjustment of these respective elements, as by a screw driver. The lock nut 40 may be provided with a second threaded aperture 42 to receive a bolt 43 which secures a cover plate 44 to prevent foreign matter from entering the threaded aperture 36. The carriage has been shown as having guide means 45 and 46 such as are conventionally provided for the guiding of another machine element which is slidable upon the carriage 12.

The operation of the antifriction device is accomplished by varying the stress or compression of the spring 18 by means of axial adjustment of the threaded bolt 37. By so varying the compression in the spring 18 the lever 17 will tend to rotate the shaft 20. Such rotational tendency of the shaft 20 will cause the eccentric portion 28 to force the roller bearing 16 into engagement with the bearing surface portion 15. The lever 17 has a high mechanical advantage in transmission of the force exerted by the spring 18 since the distance between the second end 34 of the lever 17 and the shaft axis 30 may be made many times greater than the distance between the shaft axis 30 and the second axis 29 of the cylindrical eccentric portion 28. If the distance between the shaft axis 30 and second axis 29 is regarded as a first distance, and the distance between the second end 34 of the lever 17 and the shaft axis 30 is regarded as a second distance, then the spring force of the spring 18 multiplied by the component of the second distance perpendicular to the direction of application of the spring force will equal a proper fraction of the force between the slide 13 and V-guideway 14 multiplied by the component of the first distance perpendicular to the direction of application of the last-mentioned force. The force between the slide surface 13 and V-guideway 14 will be gravitational force in this instance but obviously may include other forces, such as the force between a tool and the workpiece which the machine incorporates. A proper fraction shall be defined as one wherein the degree of the numerator is less than the degree of the denominator. For practical purposes in machine tools, it has been found that the antifriction device should be adjusted by adjustment of the threaded bolt 37 to compensate for a large portion of the weight of the carriage 12, for example 75 per cent, to thus retain 25 per cent of the weight causing the sliding friction between the slide surface 13 and V-guideway 14. By retaining a sliding mutual contact between the carriage 12 and base 11, the accuracy of the machine tool is maintained while the effective weight of the carriage 12 is reduced to thus reduce wear on parts and lessen the energy required to move the carriage 12 relative to the base 11.

The bearing has been shown as a roller bearing 16 although it will be obvious that other antifriction bearings may be used, such as needle bearings or ball bearings. The plane intersecting the shaft axis 30 and the second axis 29 has been shown as parallel to the plane of the bearing surface portion 15. This is not essential; however, it provides the maximum efficiency of the cylindrical eccentric portion 28.

A plurality of such antifriction devices would be provided for a carriage or machine element in the practical case to adequately and symmetrically support carriage 12 relative to the base 11.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A weight compensator for a slide element of a lathe having a V-way and a flat way, said ways being substantially parallel and defining a substantially horizontal path, said slide element having a complementary V-way slidably cooperating with the V-way of said lathe due to gravitational force, said slide element having a body with a surface disposed above but spaced from the flat way of said lathe and having a recess in said body above said flat way, said weight compensator comprising, first and second bearings in said recess and fastened to said body and defining a substantially horizontal axis above said flat way, a shaft having first and second ends journaled in said bearings, first and second portions on said shaft between said ends, said first portion being cylindrical and having an axis eccentrically disposed relative to said bearing axis and parallel to said bearing axis at a first distance, an antifriction bearing journaled on said first cylindrical portion and having a diameter sufficient to expose a small portion of the periphery thereof out of said recess for rolling engagement with said flat way, a lever arm having first and second ends and disposed inside said recess, said first end of said arm being fastened to said second portion of said shaft, a threaded aperture in said slide element having an axis directed substantially perpendicular to the longitudinal dimension of said arm and intersecting the second end of said arm at a second distance from the axes of said shaft ends, a threaded plug threaded into said aperture, and a compression spring compressed between said threaded plug and the second end of said arm to urge said arm in a given rotational direction, said spring being compressible by said threaded plug to urge said antifriction bearing into engagement with said flat way to relieve a portion of the sliding friction due to gravity between said cooperating V-ways.

2. A weight compensator for a slide element of a lathe having a V-way and a flat way, said ways being substantially parallel and defining a substantially horizontal path, said slide element having a complementary V-way slidably cooperating with the V-way of said lathe due to gravitational force, said slide element having a body with a surface disposed above but spaced from the flat way of said lathe and having a recess in said body above said flat way, said weight compensator comprising, first and second sleeve bearings in said recess and fastened to said body and defining a substantially horizontal axis above said flat way, a shaft having first and second ends journaled in said sleeve bearings, first and second cylindrical portions on said shaft between said ends, said first cylindrical portion having an axis eccentrically disposed relative to said bearing axis and parallel to said bearing axis at a first distance, a roller bearing journaled on said first cylindrical portion and having a diameter sufficient to expose a small portion of the periphery thereof out of said recess for rolling engagement with said flat way, said second cylindrical portion of said shaft being concentric with said sleeve bearing axis, a lever arm having first and second ends and disposed inside said recess, said first end of said arm having a cylindrical bore disposed about and keyed to said second cylindrical portion of said shaft, a threaded aperture in said slide element having an axis directed substantially perpendicular to the longitudinal dimension of said arm and intersecting the second end of said arm at a second distance from said sleeve bearing axis, a threaded plug threaded into said aperture, and a coil compression spring compressed between said threaded plug and the second end of said arm to urge said arm in a given rotational direction, said spring being compressible by said threaded plug to urge said roller bearing into engagement with said flat way to relieve a portion of the sliding friction due to gravity between said cooperating V-ways, and the ratio of said second distance to said first distance on said lever arm providing a mechanical advantage of force applied to said eccentrically disposed roller bearing, a reference line passing through said sleeve bearing and eccentric axes also passing through said second end of said lever arm, said spring establishing said lever arm in a position such that said reference line is substantially parallel to said horizontal path.

MAX DE HAAS.

REFERENCES CITED

The following references are of record in the file of this patent:

UNITED STATES PATENTS

| Number | Name | Date |
| --- | --- | --- |
| 447,015 | Reiss | Feb. 24, 1891 |
| 1,381,188 | Gury | June 14, 1921 |
| 1,926,828 | Van Berkel | Sept. 12, 1933 |
| 2,045,464 | Harley | June 23, 1936 |